United States Patent Office.

CHARLES EDOUARD CHAMBERLAND, OF PARIS, FRANCE.

FILTERING COMPOUND.

SPECIFICATION forming part of Letters Patent No. 336,386, dated February 16, 1886.

Application filed January 12, 1886. Serial No. 188,323. (No specimens.) Patented in England March 17, 1885, No. 3,423.

*To all whom it may concern:*

Be it known that I, CHARLES EDOUARD CHAMBERLAND, doctor of sciences, a citizen of the Republic of France, residing at Paris, France, have invented an Improvement in Filtering Compounds, (for which I have obtained a Patent in Great Britain, No. 3,423, bearing date March 17, 1885;) and I do hereby declare that the following is a full, clear, and exact description of the invention, which will enable others skilled in the art to which it appertains to make and use the same.

The means hitherto employed for filtering water ordinarily consist in the use of burned brick, powdered substances, and other porous material. However efficient the named substances may be for filtering purposes, yet they do not, however, retain or hold back all the germs or microbes or extremely-fine organisms which are in suspension in the water or other liquid—such, for instance, as in infected blood taken from an animal having died of splenic fever, or generally any blood infested with microbes.

Wines, vinegars, and other like beverages have been subjected to a certain degree of heat for the purpose of destroying any germs therein contained, because the means hitherto devised are inefficient in retaining said germs by way of filtration.

My invention is designed more completely to hold back and retain such germs; and it consists of a compound to be used for filtering water, wines, beverages, and all liquids generally, and is admirably adapted for domestic purposes, or in cases where it is not convenient or necessary to apply pressure for filtering.

My compound is made as follows: I take from sixty to eighty per cent. of earthenware-clay, which I dilute in water, and then mix therewith from twenty to forty per cent. of biscuit of the said clay, the said biscuit having been previously ground or reduced. This compound can be used in any kind of filter, and be grouped and secured thereto in any desired number and manner.

The manufacture of the filtering-bodies may be effected by casting, molding, or turning, as in the manufacture of pottery-ware. The filtering-body is then baked in a biscuit or other kiln in the usual way, the temperature at which it is baked ranging from 1,850° to 2,400° Fahrenheit.

A filtering-body produced from the above compound is homogeneous and fulfills the required conditions for filtering the hereinbefore-named substances, and thereby obtaining the results herein mentioned.

I claim—

A filtering compound formed of earthenware-clay and biscuit of the said clay, as hereinbefore described, combined as and in the proportions set forth, the said compound being baked, substantially as herein set forth.

In witness whereof I have hereunto signed my name in the presence of two subscribing witnesses.

CHARLES EDOUARD CHAMBERLAND.

Witnesses:
R. H. BRANDON,
D. H. BRANDON.